(12) United States Patent
Ansola Irureta et al.

(10) Patent No.: US 10,668,580 B2
(45) Date of Patent: Jun. 2, 2020

(54) CELL FOR INSERTING COMPONENTS INTO A WORKPIECE

(71) Applicant: GAINDU, S.L., Guipuzcoa (ES)

(72) Inventors: Julen Ansola Irureta, Guipuzcoa (ES); Javier Peña Arruti, Guipuzcoa (ES); Julián Orte Sebastián, Guipuzcoa (ES)

(73) Assignee: GAINDU, S.L., Guipuzcoa (ES)

(*) Notice: Subject to any disclaimer, the term of this patent is extended or adjusted under 35 U.S.C. 154(b) by 87 days.

(21) Appl. No.: 15/558,147

(22) PCT Filed: Mar. 22, 2016

(86) PCT No.: PCT/EP2016/056299
§ 371 (c)(1),
(2) Date: Sep. 13, 2017

(87) PCT Pub. No.: WO2016/150983
PCT Pub. Date: Sep. 29, 2016

(65) Prior Publication Data
US 2018/0043485 A1     Feb. 15, 2018

(30) Foreign Application Priority Data
Mar. 26, 2015 (EP) ............................ 15382148

(51) Int. Cl.
*B23P 19/02* (2006.01)
*B23P 19/00* (2006.01)
(Continued)

(52) U.S. Cl.
CPC .............. *B23P 19/02* (2013.01); *B23P 19/001* (2013.01); *B23P 19/04* (2013.01); *B23P 21/00* (2013.01)

(58) Field of Classification Search
CPC ......... B23P 19/02; B23P 19/001; B23P 19/04; B23P 2700/50; B23P 21/00
See application file for complete search history.

(56) References Cited

U.S. PATENT DOCUMENTS

| 5,131,535 A | 7/1992 | O'Connor et al. |
| 6,256,868 B1* | 7/2001 | Sugito ............... B23P 19/001 29/701 |
| 6,467,154 B1* | 10/2002 | Beggs ............... B23P 19/001 29/701 |

FOREIGN PATENT DOCUMENTS

| CA | 2881506 A1 | 2/2014 |
| DE | 19754972 A1 | 6/1999 |

(Continued)

OTHER PUBLICATIONS

Machine Translation for EP-1493529-A1 (Year: 2005).*
(Continued)

*Primary Examiner* — David P Bryant
*Assistant Examiner* — Christine Bersabal
(74) *Attorney, Agent, or Firm* — Cantor Colburn LLP

(57) ABSTRACT

A cell for mounting components in a workpiece includes a pressing device for inserting at least two different components into a workpiece using pressure. The device includes: a press, a plurality of pushers and a striking plate. The pushers are situated vertically and configured to receive the force exerted by the press. One end of each pusher is configured to receive a component to be inserted in the workpiece. The striking plate is configured to bear the insertion stresses exerted by the press and includes a plurality of support points that may be moved until they are alternatively positioned in an aligned way with a pusher arranged coaxially to the press. The cell includes a robot provided with a claw, the robot being configured to hold the workpiece and position it in the pressing device.

20 Claims, 9 Drawing Sheets

(51) Int. Cl.
*B23P 19/04* (2006.01)
*B23P 21/00* (2006.01)

(56) References Cited

FOREIGN PATENT DOCUMENTS

| EP | 1493529 A1 | * | 1/2005 | ............. B23P 19/00 |
|----|------------|---|--------|--------------------------|
| EP | 1493529 A1 |   | 1/2005 |                          |
| EP | 2664412 A2 | * | 11/2013 | ............ B23P 19/001 |
| EP | 2664412 A2 |   | 11/2013 |                          |
| JP | 2009233813 A |   | 10/2009 |                        |

OTHER PUBLICATIONS

Machine Translation for EP-2664412-A2 (Year: 2013).*
International Search Report dated Jun. 10, 2016 re: Application No. PCT/EP2016/056299; pp. 1-4; citing: EP 1 493 529 A1, U.S. Pat. No. 6,467,154 B1, JP 2009 233813 A, EP 2 664 412 A2, CA 2 881 506 A1, U.S. Pat. No. 6,256,868 B1, U.S. Pat. No. 5,131,535 A and DE 197 54 972 A1.
Written Opinion dated Jun. 10, 2016 re: Application No. PCT/EP2016/056299; pp. 1-4; citing: EP 1 493 529 A1, U.S. Pat. No. 6,467,154 B1, JP 2009 233813 A, EP 2 664 412 A2, CA 2 881 506 A1, U.S. Pat. No. 6,256,868 B1, U.S. Pat. No. 5,131,535 A and DE 197 54 972 A1.

* cited by examiner

CELL FOR INSERTING COMPONENTS INTO A WORKPIECE

TECHNICAL FIELD

The present disclosure pertains to the field of component mounting machines and cells.

BACKGROUND

The conventional mounting and assembly processes are formed by a set of equipment that mounts, sequentially or in parallel, the different components that form a workpiece. For example, often there are as many robots provided as there are components that must be inserted into a workpiece, and each robot, by means of a tool, inserts its component as the workpieces run on a conveyor belt, until the last robot completes the workpiece.

The main drawback of this process is that it needs as many robots as there are components required by the workpiece. This also requires a lot of space. Moreover, the same number of robots is needed regardless of the workload.

The American patent U.S. Pat. No. 6,256,868B1 tries to alleviate the above drawbacks via a mounting station in which a single robot is capable of sequentially mounting different components on a workpiece, via the help of other elements, such as an apparatus for providing components to the robot in the order required, a pallet to provide the workpieces to the robot and a conveyor belt.

In some applications it is not only required mounting different components on the same workpiece, but it is also needed to exert great pressure in order to insert the components in the corresponding position of the workpiece. In these cases, the robot tends to be incapable of applying the necessary pressure to the full range of components that it handles.

Therefore, the need for a device that combines the advantages of great versatility regarding the components it can handle and high pressing capacity without damaging the workpieces is appreciated.

SUMMARY

The disclosure provides a cell for mounting components on a workpiece comprising a pressing device to insert at least two components using pressure into a corresponding number of holes of a workpiece, where the device in turn comprises: a press; a plurality of pushers that may individually receive a component to be inserted, the pushers being configured to move and be alternatively situated coaxially to the press in order to receive the force exerted by said press and transmit it to the component to be inserted in the hole of the workpiece; and a striking plate that is configured to bear the insertion stresses exerted by said press, where the striking plate comprises a plurality of support points that may be moved in order to be alternatively positioned aligned with a pusher that is arranged coaxially to the press. The cell of the disclosure comprises a robot that is configured to position the workpiece in the pressing device such that one of the holes of the workpiece is between the pusher and the support of the striking plate and aligned with the shaft of the press. The robot is provided to hold a workpiece during the insertion operation.

In a possible embodiment, the operation of the pressing device is the following:

The pushers are loaded with the components to be inserted in the workpieces (preferably one component to each pusher).

The pushers move until a first pusher (the one that is loaded with a first component to be inserted) is positioned such that it is aligned and coaxial with the actuation shaft of the press. Preferably, all the pushers move linearly until the first pusher is aligned with the press, but alternatively only the first pusher may move and the others do not move.

The striking plate moves (it may be a carousel, for example, which rotates with respect to a shaft, with the support points arranged in arms of the aforementioned carousel) until a first support point (that which corresponds to the first component to be inserted) is positioned aligned with the first pusher (which in turn in aligned with the press).

The robot positions the workpiece on the striking plate (on the first support) such that a first hole (the hole in which the component is to be inserted) is aligned with the press. The robot holds the workpiece during the entire insertion operation, i.e., it does not leave the workpiece on the striking plate and move away.

The press that acts on the first pusher that inserts the first component in the first hole of the workpiece is activated.

The process is repeated with the rest of the components to be inserted, i.e., the pushers move (or only the first and the second pusher) until a second pusher with a second component is aligned with the press, the striking plate moves to position a second support point and the robot moves the workpiece to present a second hole aligned with the press (the workpiece being positioned on the second support point, but held by the robot). Then, it is repeated for a third or fourth (or more) components.

In a possible embodiment, the plurality of pushers are configured to receive a respective plurality of components, where said components are of at least a first type and at least a second type that is different to the first. That is to say, each pusher may be loaded with a component that is different or the same as the other pushers, such that the same pressing device may quickly and simply insert (using a single press and without having to change or modify the pushers) all the different components of a workpiece.

In a possible embodiment, the pushers comprise a portion that is common or identical to all of them (for example, a cylinder) and an inner portion that is specific for each component that is to be inserted. This lower portion receives the push from the common portion when the press in activated. The lower portion is preferably interchangeable to enable the component to be inserted to be changed and use the same pusher to insert several components.

The press is preferably an electro press, although it may be a mechanic or hydraulic press.

The press is preferably arranged vertically and the robot holds the workpiece below the press such that one of the holes of the workpiece is in a vertical position. Obviously, the pushers in this case are also arranged vertically. In other embodiments, the press or pushers may be arranged with their shafts horizontal or even in a slanted position.

The pressing device may be connected to a linear manipulator configured to move the pushers until one of them is aligned with the press. The linear manipulator may enable the pushers to be moved to loading positions of the plurality of components to be inserted, which come from a storage or feed system, for example.

The linear manipulator may be configured to provide simultaneously a plurality of at least a first type of components and at least a second type of components that is different to the first type, so that they may be coupled to a respective plurality of pushers of the pressing device.

In a preferred embodiment, the workpieces are arranged on overpallets that comprise a plurality of reference elements designed to indicate the position and orientation in which a workpiece is placed on an overpallet. In this embodiment it is foreseen that the robot may pick up an overpallet, on which a workpiece has been deposited, and carry the assembly made up of the overpallet and the workpiece to the pressing device. In this way, since the robot knows the position of the reference elements of the overpallet, it also always knows the position of the workpiece with respect to the claw, and consequently, of all the holes thereof and each one of the holes may easily be placed with the required position and orientation in the pressing device.

The cell disclosure may further comprise: a conveyor belt for transporting a plurality of transport implements; a plurality of overpallets configured to be placed over a respective transport implement, where each overpallet comprises a plurality of reference elements designed to indicate the position and orientation in which a workpiece must be placed on an overpallet.

In a possible embodiment, the robot is configured to pick up an overpallet, on which a workpiece has been deposited, and carry the assembly formed by the overpallet and the workpiece to the pressing device.

The claw (or clamp, gripper) of said robot comprises a lower clamp, an upper clamp and at least one pusher. The lower clamp of said claw may comprise two symmetrical arms, inside which there is a number of guides arranged, that are configured to hold an overpallet.

The workpiece where the components are mounted with the cell of the disclosure may be a knuckle of a vehicle.

Advantages and additional features of the disclosure shall be made clear in the detailed description below and particular attention will paid to them in the attached claims.

BRIEF DESCRIPTION OF THE DRAWINGS

As a complement to the description, and for the purpose of helping to make the characteristics of the disclosure more readily understandable, in accordance with a preferred practical exemplary embodiment thereof, the description is accompanied by a set of figures constituting an integral part of the same, which by way of illustrative and non-limiting examples, represent the following.

DETAILED DESCRIPTION OF THE DRAWINGS

Figure 1:
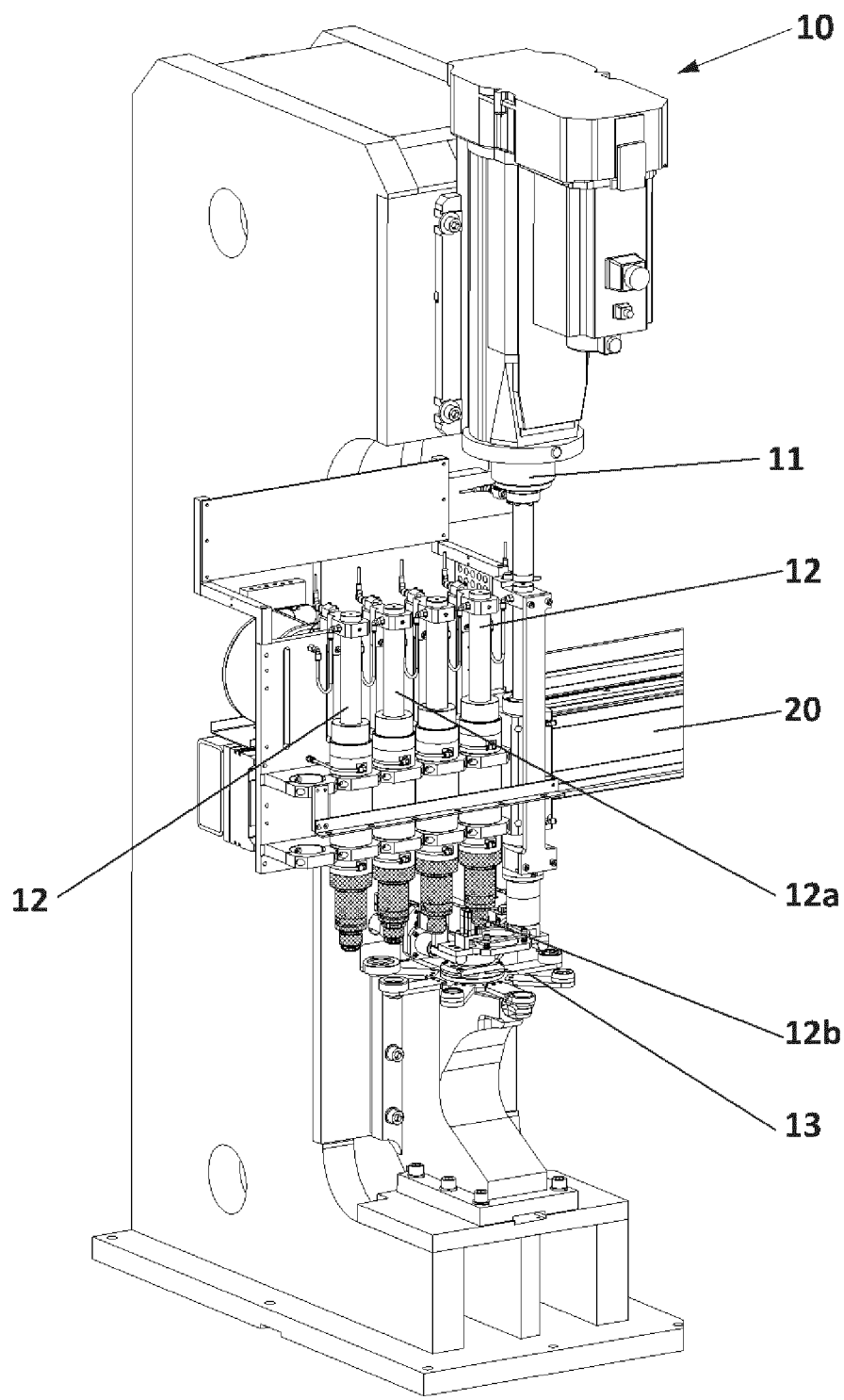
FIG. 1 shows a pressing device in accordance with an embodiment of the disclosure.

FIG. 1 shows a pressing device in accordance with an embodiment of the present disclosure. The pressing device 10 is capable of mounting, with a single press, different components in several positions of one or several workpieces, controlling both the insertion force and position. That is to say, the device is flexible with regards to components to be inserted and to the types of workpieces into which they are inserted. The components may be different in length and diameter and may be inserted in a certain direction. The workpieces may be of different shapes and the insertion areas of the components may be located at different points and angles in the space.

The pressing device 10 comprises:

a single press 11, which in the embodiment of FIG. 1, is electric (in other embodiments the press may be hydraulic or mechanical), which controls the position and insertion force of the components. In the embodiment shown in FIG. 1, the press is an electro press with its actuation shaft arranged vertically (but in other embodiments the shaft of the press may be arranged horizontally or inclined);

a plurality of pushers or intermediate elements 12, which in the embodiment of FIG. 1, are arranged vertically (they may also be arranged horizontally or inclined, but with the shafts thereof parallel to the actuation shaft of the press) between the press 11 and the workpiece 100, 110 (when the latter is arranged in its corresponding place) into which the components are to be inserted; these intermediate elements 12 move until one of them is aligned and coaxial to the press 11 and are specific for each component to be mounted; the intermediate elements 12 are located in a number of housings arranged for this purpose in the intermediate portion of the pressing device 10. That is to say, depending on the workpiece that is being worked and on the components that must be inserted into the workpiece, the pressing device 10 has some intermediate elements 12 or others. Preferably, the pushers or intermediate elements 12 are vertical cylinders. All of them are formed by a portion that is identical to each other 12a and by a lower portion 12b that is specific to each of them. This portion or end 12b is specific for each component that is to be inserted in each workpiece. By changing the lower end 12b of an intermediate element 12, it enables a new component with characteristics different to that of the component previously coupled to the intermediate element 12 to be connected or coupled to this same intermediate element 12, thus achieving the versatility of the pressing device 10. The end 12b of each intermediate element 12 is the base of the push exerted by the pressing device 10 and it must withstand the force exerted by the press 11;

a striking plate 13 for counter-reacting the insertion stresses, on which a portion of the workpiece into which the components are to be inserted is supported (as explained below), and the position of which varies depending on the shape of the area of the workpiece where each component is inserted. The striking plate 13 comprises several support points, generally different, on which one or more respective points of each workpiece may be placed or aligned. For this reason, the striking plate 13 is configured to turn about a vertical shaft, thus facilitating the necessary support to the workpiece that is being worked. The striking plate 13 of FIG. 1 has 8 positions (support points), but this number may vary. In this embodiment, the striking plate 13 is a carousel that preferably has a plurality of spokes arranged transversally to said vertical shaft, in each end of which there are said support points.

At the same time, several different components (each one in the end of a pusher 12) may be coupled to the device 10. For example, it may have at least one component of a first type and at least one component of a second type. It may also have at least one component of a third type, at least one component of a fourth type, etc.

The pressing device 10 is based on a C-shaped structure, which is configured to bear the counter reaction of the insertion forces. The pressing device remains fixed. As already mentioned, the components are inserted with a single press 11, but by controlling the force and the dimension of the insertion of each component independently.

The plurality of pushers 12 is connected to a linear manipulator 20 that does not form part of the pressing device 10, which enables one of the pushers 12 to be alternatively positioned below the press 11. The pressing device 10, which remains fixed, receives the components that are to be inserted into a workpiece via the linear manipulator 20 depending on the workpiece concerned and on the components that must be inserted therein. In the same journey along the linear manipulator 20, several different components (each one designed to be coupled to the end 12*b* of a pusher 12) are loaded into the plurality of pushers 12, for example, several components of a first type and several components of a second type, or all the components being different to each other.

Figure 2:
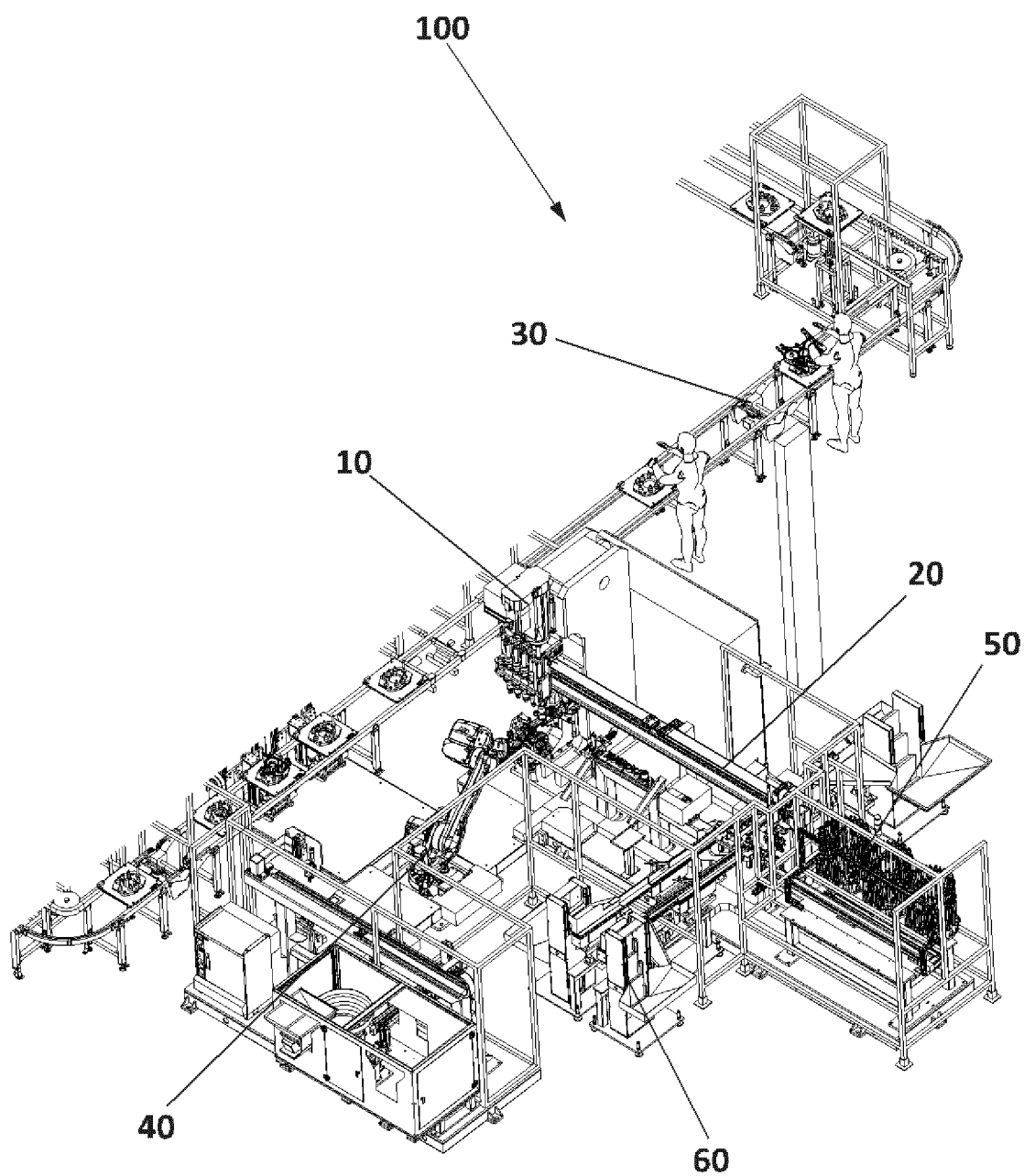
FIG. 2 schematically shows the elements that form part of the cell or complete mounting station of the disclosure.
Figure 3:
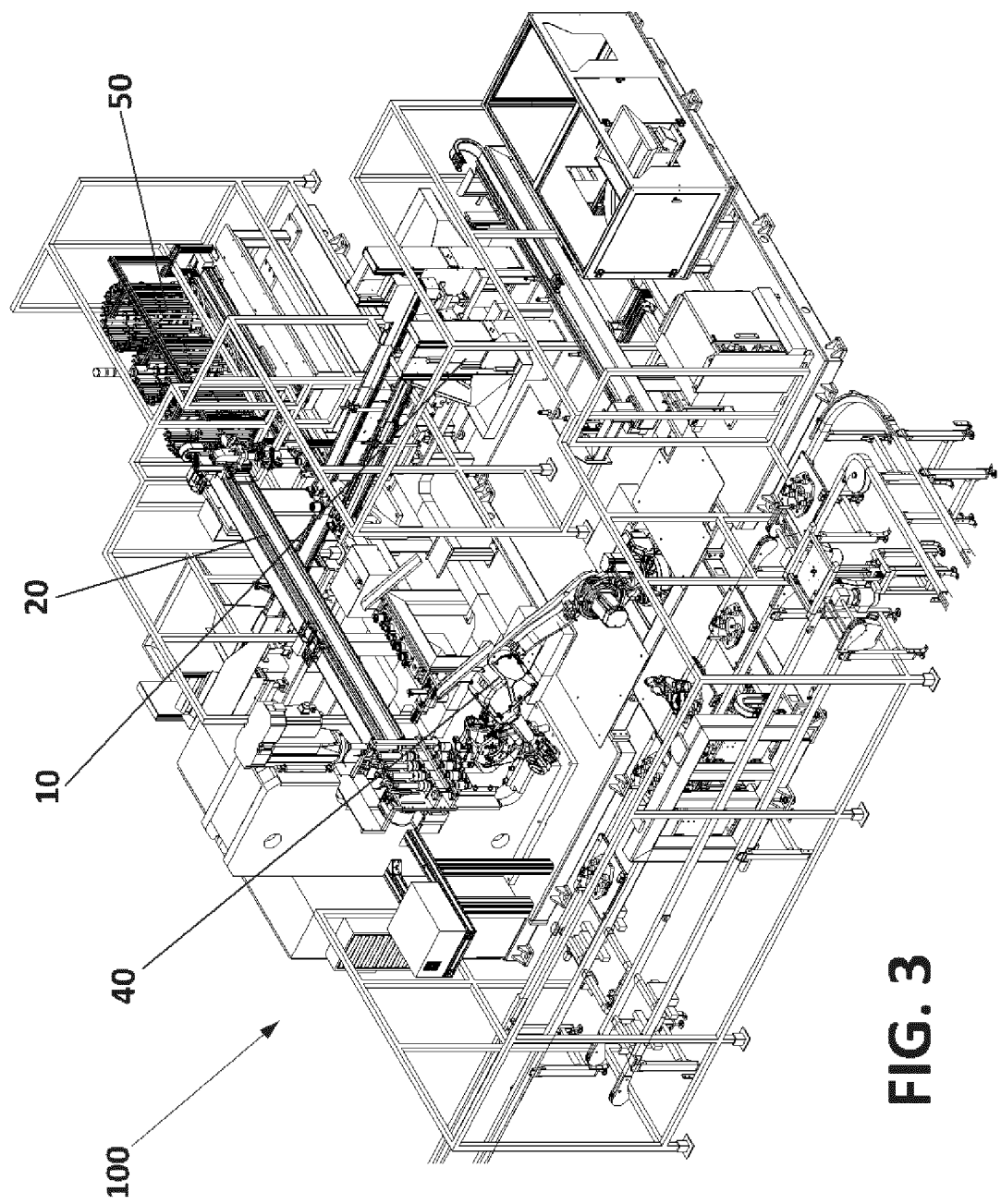
FIG. 3 shows another view that includes a portion of the mounting station.

FIG. 2 schematically shows the elements that, along with the pressing device 10, form part of the cell, station or complete mounting system of the present disclosure. FIG. 3 shows another view that includes a portion of the system, station or mounting installation. The pressing device 10 receives the components that are to be inserted into a workpiece through the linear manipulator 20. Each component is coupled to the lower portion 12*b* of each intermediate element 12 of the pressing device 10. As explained above, an appropriate lower portion 12*b* for receiving a component to be inserted in the workpiece is previously -during the planning stage before the workpiece is mounted-selected and connected to each intermediate element 12 that is to be used. These components, which come from a storage system 50, are loaded into the linear manipulator 20. In FIG. 2, the storage system is an assembly of indexing tables, but any other storage system may be used. The components access the pressing device 10 via a number of carriages or guides arranged along the linear manipulator 20. Alternatively, the components may be provided to the pressing device 10 from a feeder 60. In FIG. 2, the feeder is a step feeder. As in the previous case, the components access the pressing device 10 via a number of carriages or guides.

Figure 9:
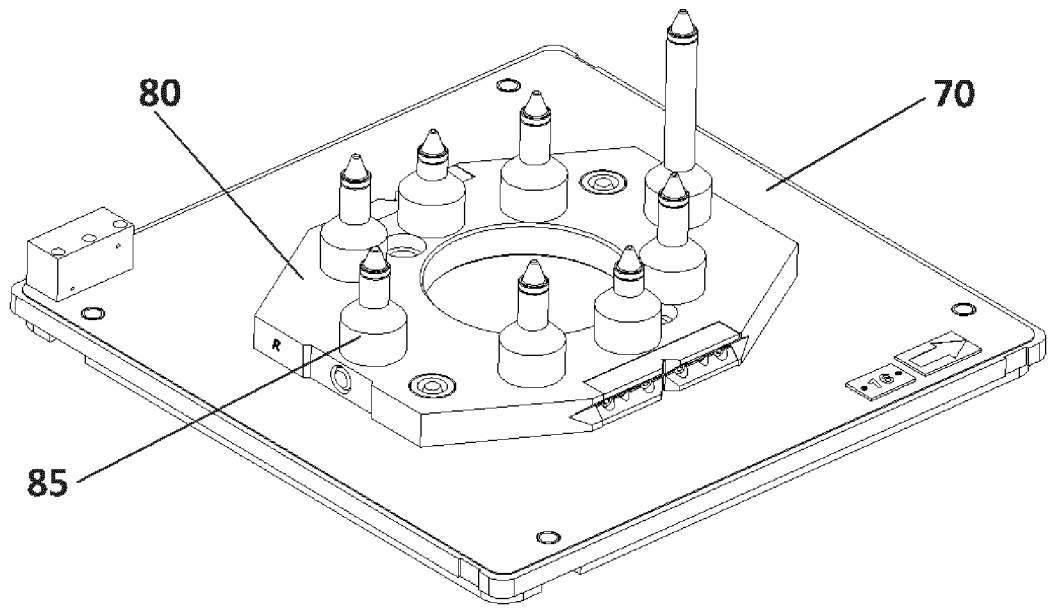
FIG. 9 shows an overpallet situated on a transport implement.

A robot 40, for example, a robot with six degrees of freedom is responsible for picking up the workpieces in which the components are to be inserted. The workpieces into which the components are to be inserted (via the pressing device 10) move on a conveyor belt 30. The belt 30 transports a series of transport implements or conventional pallets 70. On each transport implement or pallet 70 there is a second pallet or "overpallet" 80. FIG. 9 shows an overpallet 80 situated on a pallet or transport implement 70.

Figure 4:
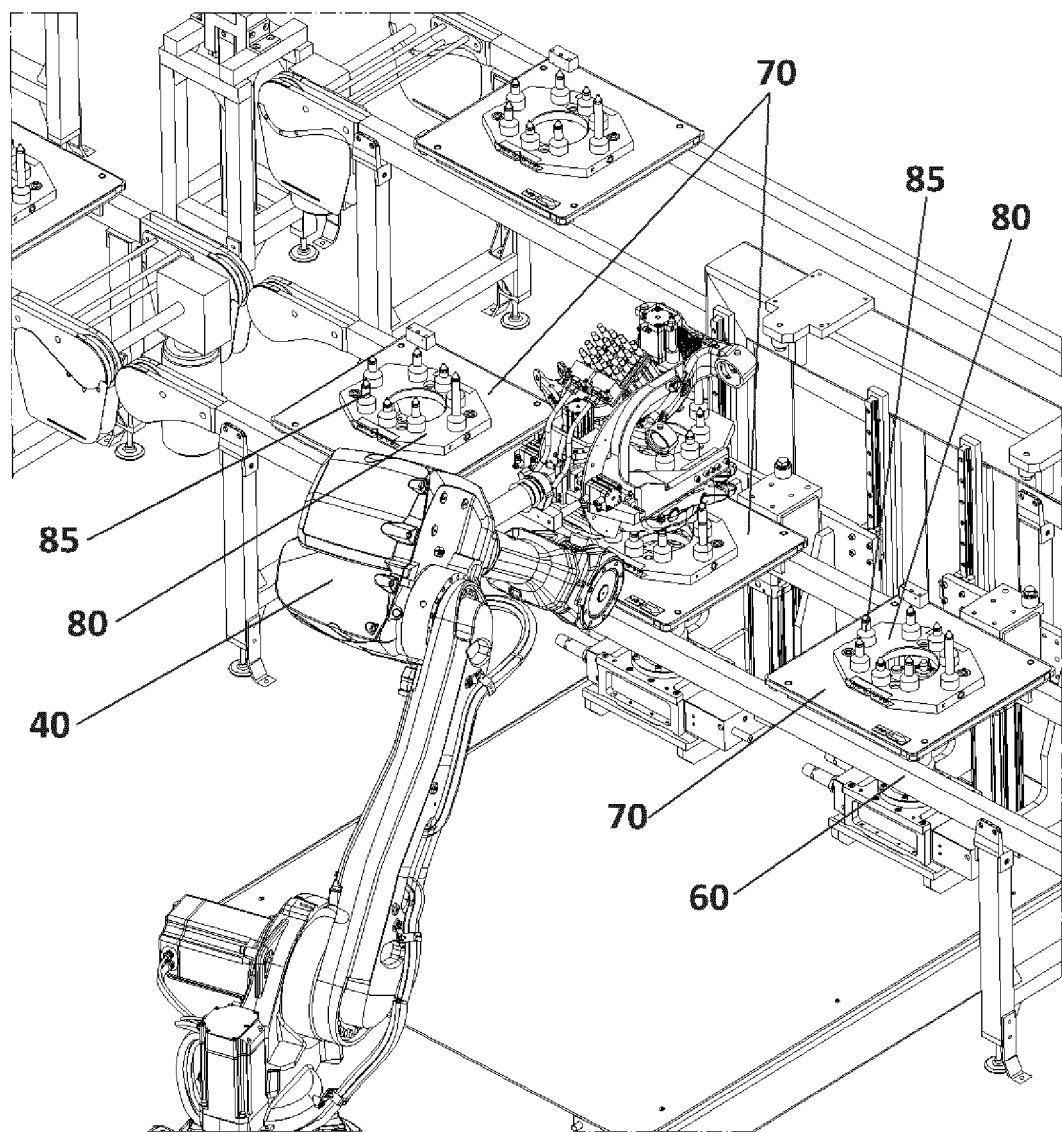
FIG. 4 shows a detailed view of the conveyor belt and overpallet of the cell of the disclosure.
Figure 5:
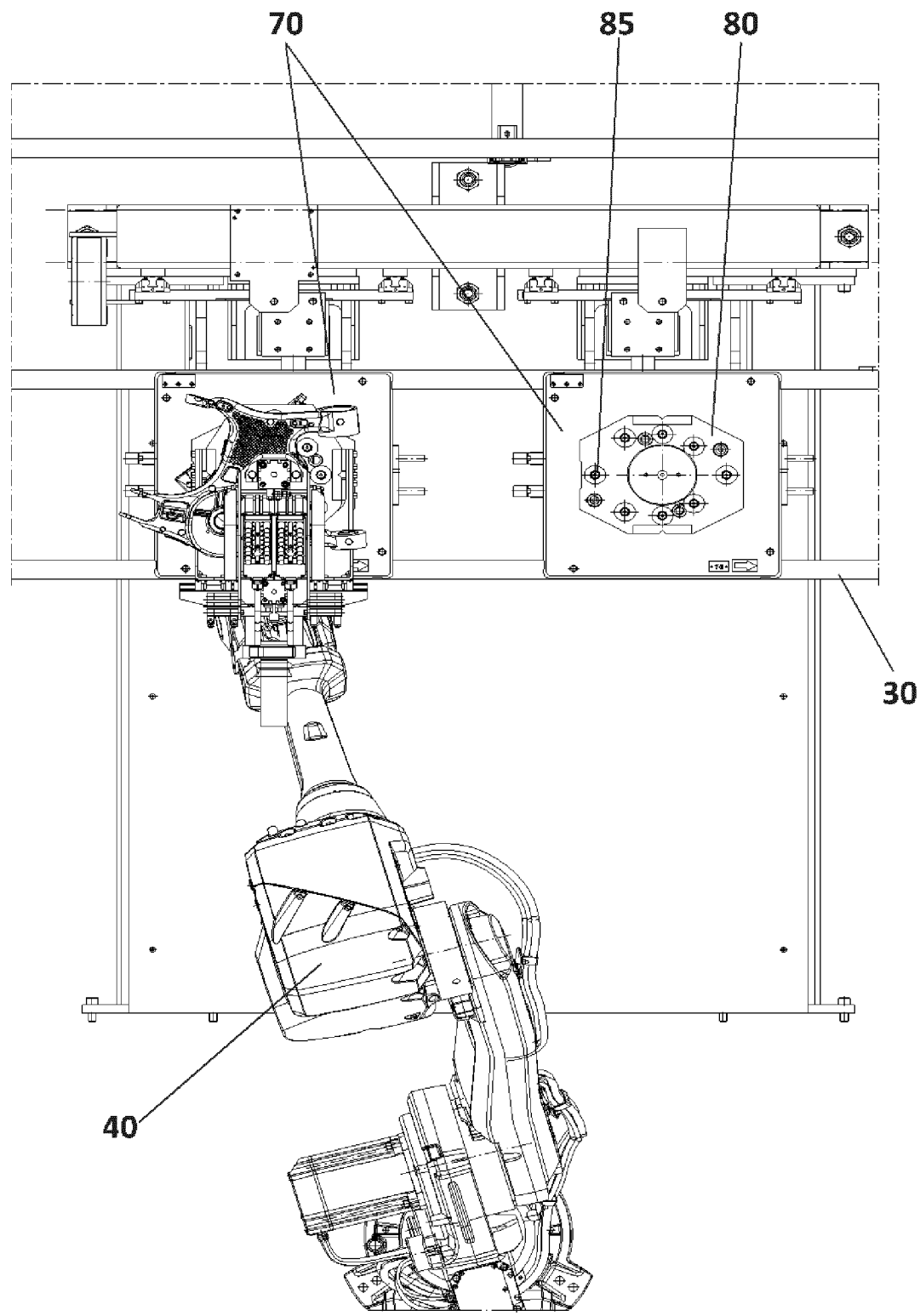
FIG. 5 shows an alternative view of the robot picking up an overpallet and workpiece with the claw thereof.

FIG. 4 shows a detailed view of the conveyor belt 30 and "overpallet" 80. The second pallet or overpallet 80, which is situated on the transport implement, has a number of reference parts or points 85 that serve to reference the workpiece that is to be deposited on the overpallet 80. The workpieces are deposited on the second pallets or "overpallets" 80, preferably by means of an operator. There is only one correct position in which the workpiece may be supported on the second pallet or "overpallet" 80, which is the position defined or marked by the aforementioned reference points 85. The robot 40 picks up the assembly formed by the "overpallet" and the workpiece deposited thereon with its clamp or claw (or gripper). In FIG. 4 it can be seen how the robot 40 is picking up, with its claw, the assembly formed by the overpallet 80 and the workpiece that had previously been deposited thereon during the circulation of the overpallet 80 on a transport implement 70 that travels over the conveyor belt 30. FIG. 5 shows an alternative view of the robot picking up an overpallet and workpiece with its claw.

Figure 6A:
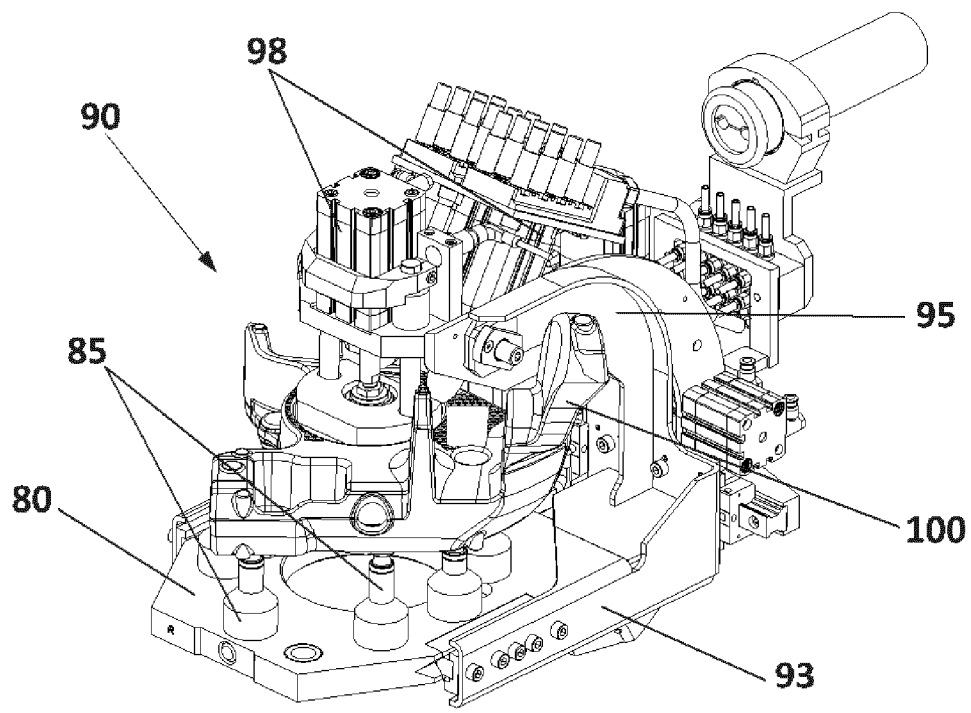
FIGS. 6A and 6B show a claw of the robot that is holding a workpiece, in accordance with a possible embodiment of the disclosure.

FIG. 6A shows a claw (or clamp, or gripper) 90 of the robot 40 in accordance with a possible embodiment of the disclosure. The claw 90 comprises a lower clamp 93 and an upper clamp 95. The lower clamp 93 of the claw of the robot grabs the "overpallet" 80, which in turn carries the workpiece 100. As may be seen, the workpiece 100 is placed on the overpallet 80 in the only possible correct position, due to the references 85 of the overpallet 80. The claw or gripper 90 closes, like a sandwich, by means of at least one pusher 98. In a possible embodiment, the claw comprises several pushers 98 in the lower portion, which enables the assembly on the workpiece 100 and overpallet 80 to be closed. The pushers enable the pressing device to be adapted to the diversity of workpieces, i.e., it ensures the referencing of the piece depending on the diversity. The robot 40 thus carries the workpiece 100 until it is positioned on or aligned with the striking plate 13 of the pressing device 10. The robot appropriately positions and orients the workpiece. This may be done because the claw of the robot picks up the workpiece 100, along with the overpallet 80, and therefore it is always possible to know the position of the workpiece 100 with respect to the claw, and therefore of all the holes where the components must be inserted. This appropriate position and orientation are none other than the ones that enable the component in question to be received vertically, due to the push of each intermediate element 12. The workpiece is aligned and positioned in the position of the corresponding striking plate 13. Note that the robot 40 does not release the workpiece 100 or deposit it on the striking plate 13, but rather it locates it on the same without releasing it, so that the pressing device 10 may insert the corresponding component using pressure and the stress exerted by this pressure is absorbed by said striking plate 13. As in a general case, the workpiece 100 must receive several components, which are preferably already coupled to several corresponding ends 12*b* of the intermediate elements 12, then the robot 40 extracts the claw from the space between the intermediate elements 12 and the striking plate 13, moves (turns, rotates, etc.) the assembly formed by the overpallet 80 and the workpiece 100, the pressing device 10 moves the striking plate, if necessary, in order to prepare the latter to receive the overpallet 80 in the appropriate position and orientation, and lastly, it re-orients and re-aligns the assembly formed by the workpiece 100 and overpallet 80 on the striking plate 13, ready so that a new component may be vertically inserted, using pressure, in the corresponding portion of the workpiece 100. The robot holds the workpiece with the gripper, but without force being carried out. That is, the servomotors of the claws are disconnected so that it may bear the small misalignments in the pressing.

Figure 7A:
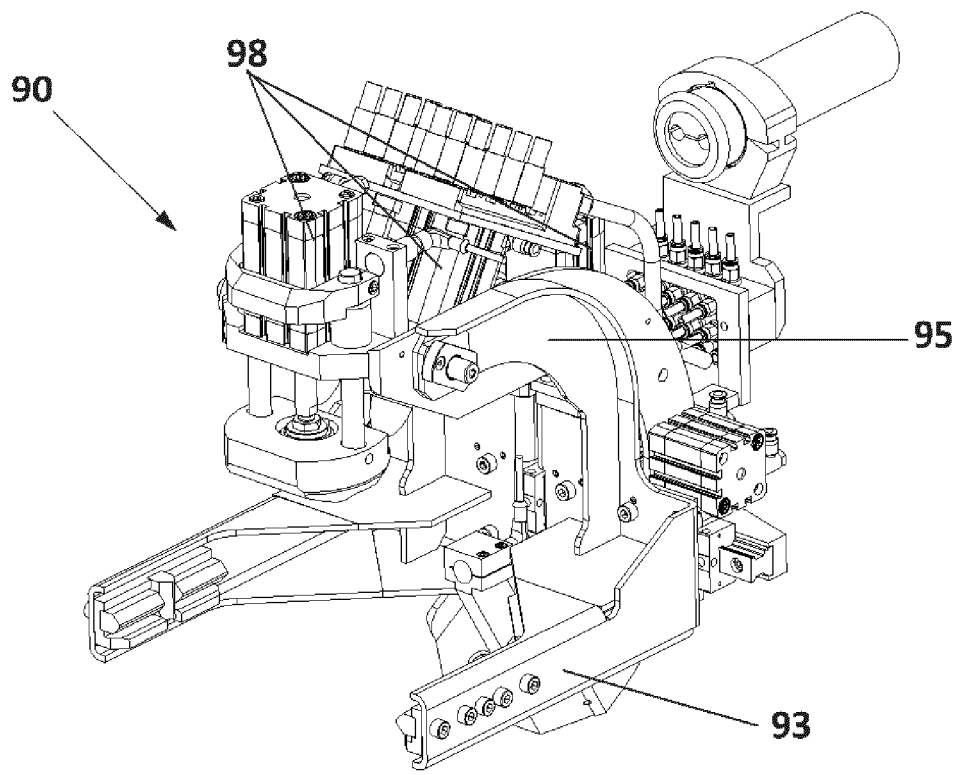
FIGS. 7A and 7B show a claw of the robot, without a workpiece, in accordance with a possible embodiment of the disclosure.
Figure 7B:
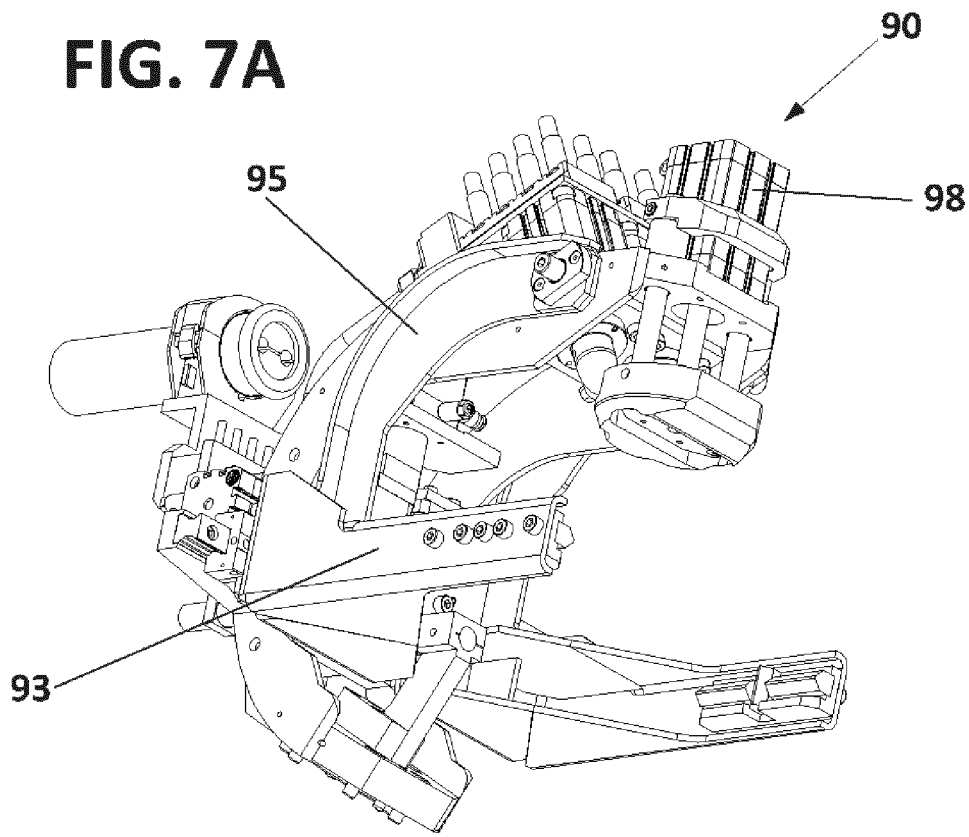
Figure 8A:
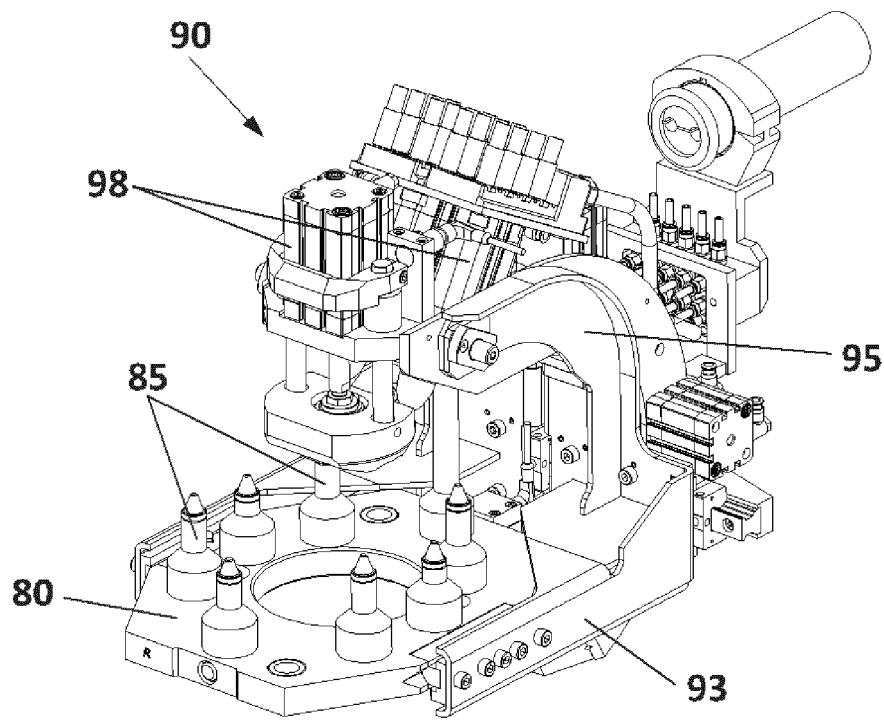
FIGS. 8A and 8B show a claw of the robot that is holding an overpallet, in accordance with a possible embodiment of the disclosure.
Figure 8B:
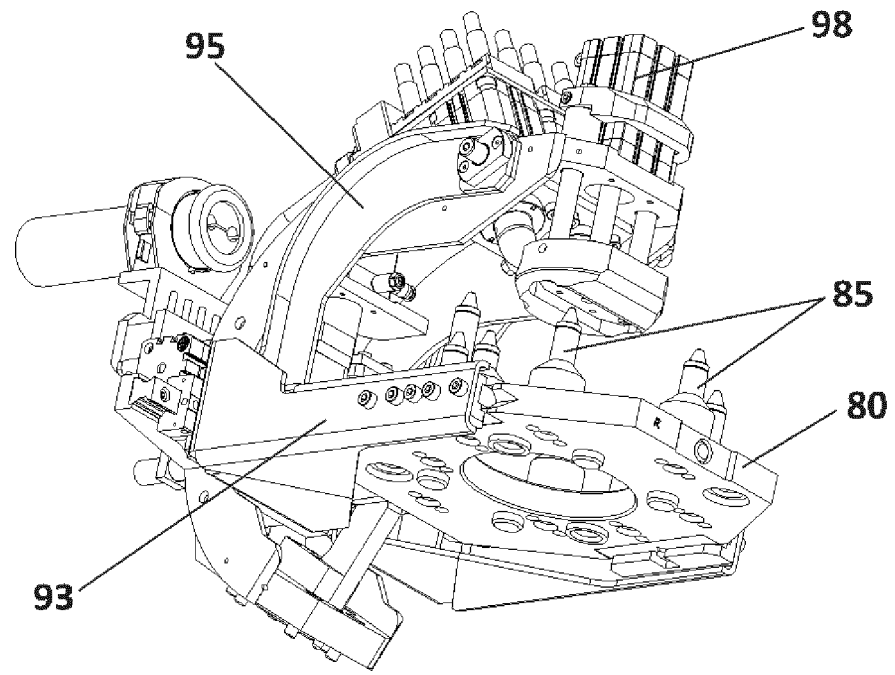

FIGS. 7A and 7B show a possible implementation of the claw (or clamp or gripper) 90, in which the lower 93 and upper 95 clamps, as well as the pushers 98, may be seen. It may be seen that the lower clamp 93 is formed by two grippers, arms or holding elements, which are elongated and symmetrical, inside which there is a number of guides configured to hold the overpallet 80. This is clearly seen in FIG. 8A. In FIG. 8B, which illustrates an alternative view of FIG. 8A, it may also be seen that the two arms or grippers that form the lower clamp 93 are especially designed so that the shape of the overpallet 80 adapts to said lower clamp 93.

In parallel to this robot 40 activity, the components that are to be inserted in the corresponding places of each workpiece are provided by a storage system 50 or by a feeder 60. In FIG. 2, the storage system is an assembly of indexing tables and the feeder 60 is a step feeder, but any other storage system or feeder may be used. Each component to be placed is coupled to or hooked on the corresponding lower end 12b of the intermediate element 12 of the pressing device 10.

Once the components have been inserted and pressed into the workpiece in question, the robot 40 returns the workpiece to the conveyor belt 30. It may return it to the same position or a different one (in order to reduce the cycle time).

As may be seen, the pressing device 10 uses a single press 11 for all the different components (different to each other) that must be inserted in a workpiece. Therefore, it reduces the pressing units. This is achieved by designing a pressing device 10 that adapts to all the workpieces and all the components that must be inserted into the workpieces, even if the components must be placed in different positions, with different angles or are of different sizes (e.g. diameter). When the type of workpiece is changed, it is possible that the end element 12b of an intermediate element 12 may have to be changed and the striking plate 13 turned.

Figure 6B:
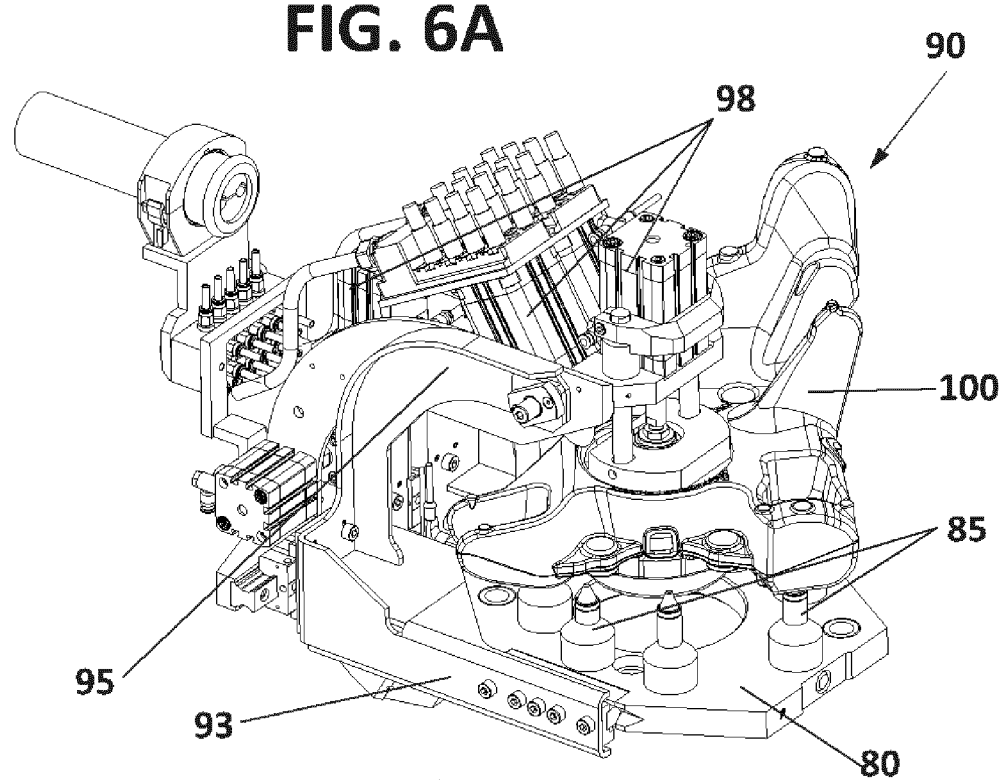

The pressing device 10, along with the overpallet 80 and the claw 90, may be used in any application that requires the insertion of components using great pressure on a workpiece. The assembly is especially useful when the workpiece in question is relatively asymmetrical, that is, it has complex shapes, angles, holes, etc., which makes inserting and robotic pressing especially complicated. In a possible embodiment, the workpiece 100 is a knuckle or LRCA (Lower Rear Control Arm) of the suspension of a vehicle. Returning to FIG. 6A, the workpiece held by the claw 90 is a knuckle. FIG. 6B shows an alternative view of the same workpiece held by the same claw 90.

Figure 10:
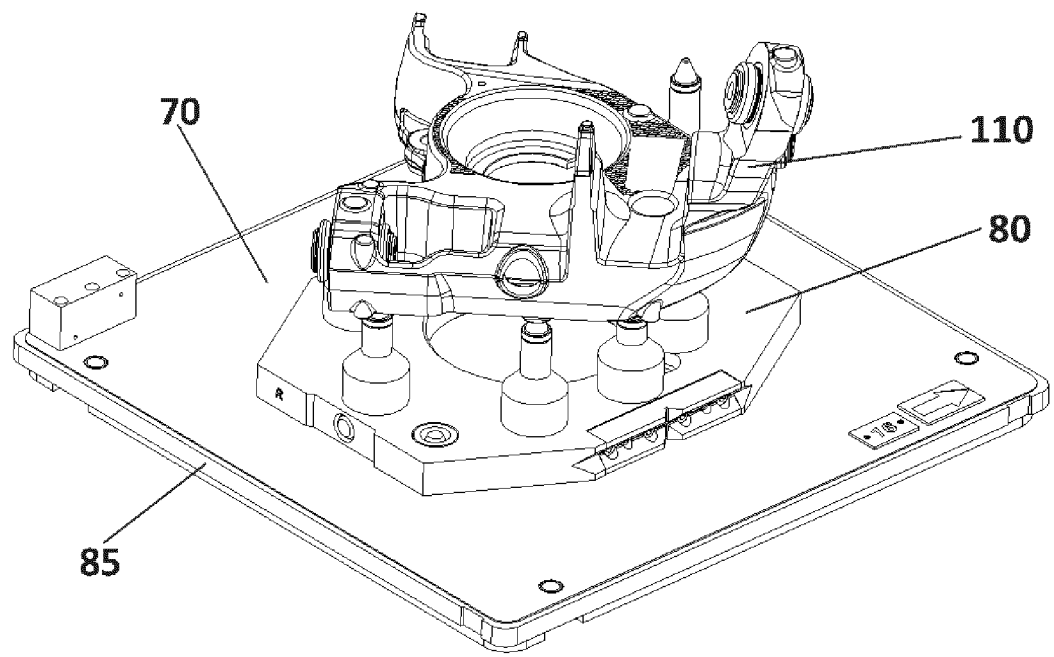
FIG. 10 shows a knuckle situated on the overpallet of FIG. 9.

FIG. 10 shows a knuckle 110 situated on the overpallet 80 of FIG. 9. The knuckle 110 occupies the only possible correct position on the overpallet 80, due to the references 85 arranged raised on the overpallet 80. Thus, when the robot 40 holds, with its claw 90, the overpallet 80, which is perfectly adjusted to the geometry of the lower claw 93, the robot 40 transports the knuckle 110, which is perfectly referenced with regard to the overpallet 80. The robot then places and orients, without setting it down, the assembly formed by the overpallet 80 and knuckle (or workpiece in general) on the striking plate 13, of the pressing device 10. Since at the same time or substantially at the same time, the pushers or intermediate elements 12 of the pushing device 10 have been adapted at the lower end 12b thereof with the components that must be inserted using pressure in the holes or respective positions of the workpiece, the installation is ready to introduce said components into the workpiece. In the event that the workpiece is a knuckle 110, the components are usually bushes. When the workpiece is correctly orientated/aligned on the striking plate 13, the press 11 is activated and it applies the necessary insertion force so that the pushers or intermediate elements 12, via the ends 12b thereof, push the components, such that the latter are inserted into the corresponding place of the workpiece. Due to the striking plate 13, which absorbs the insertion stresses, the workpiece is not damaged by the pressure. Once the components are inserted into the workpiece, the robot 40 deposits the workpiece (along with the overpallet) where appropriate (preferably on a transport implement, so that it may be carried to where is appropriate).

The invention claimed is:

1. A cell for mounting components on a workpiece, the cell comprises:
   a pressing device to insert, using pressure, at least two components in a corresponding number of holes of a workpiece, wherein the pressing device in turn comprises: a press having an actuation shaft; a plurality of pushers, each including a shaft, arranged to individually receive a component of said at least two components to be inserted, wherein the shaft of each of the pushers is parallel to said actuation shaft of the press, the pushers being configured to move and be alternatively situated coaxially to the press in order to receive force exerted by said press and transmit it to the component to be inserted into the hole of the workpiece; a striking plate that is configured to bear insertion stresses exerted by said press, where the striking plate is configured to turn around a shaft parallel to said actuation shaft and comprises a plurality of support points that may be moved in order to be alternatively positioned in an aligned way with a pusher of said plurality of pushers that is arranged coaxially to the press; and a linear manipulator configured to move the pushers until one of them is aligned with the press, the linear manipulator enabling the pushers to be moved up to loading positions of the at least two components to be inserted, coming from a storage or feeder system, and wherein said at least two components are provided simultaneously to respective pushers, and
   a robot configured to position the workpiece in the pressing device such that one of the holes of the workpiece is between the pusher and the support of the striking plate and aligned with the shaft of the press, the robot being foreseen to locate the workpiece on the striking device without releasing the workpiece and hold the workpiece during an insertion operation but without force being carried out.

2. The cell of claim 1, where said plurality of pushers are configured to receive a respective plurality of components, where said components are of at least a first type and at least a second type that is different to the first one.

3. The cell of claim 1, where the pushers comprise a portion that is common or identical to all of them and a lower portion that is specific for each component that is to be inserted, the said lower portion being configured to receive the push from the common portion when the press is activated.

4. The cell of claim 3, in which the lower portion is interchangeable to enable the component to be inserted to be changed and use the same pusher to insert several components.

5. The cell of claim 1, where said press is an electro press.

6. The cell of claim 1, where the press is arranged vertically and the robot holds the workpiece below the press such that one of the holes of the workpiece is in a vertical position.

7. The cell of claim 1, where said linear manipulator is configured to provide simultaneously a plurality of components of at least a first type and at least a second type that is different from the first type, to be coupled to a respective plurality of pushers of the pressing device.

8. The cell of claim 1, where the workpieces are arranged on a plurality of overpallets comprising a plurality of reference elements configured to indicate the position and orientation in which a workpiece is placed on at least one overpallet.

9. The cell of claim 8, where said robot is configured to pick up the at least one overpallet having the workpiece placed thereon and carry the at least one overpallet having the workpiece placed thereon to the pressing device.

10. The cell of claim 1 further comprising:
   a conveyor belt configured to transport a plurality of transport implements; and
   a plurality of overpallets that are configured to be placed on a respective transport implement, wherein each of the overpallets comprises a plurality of reference elements designed to indicate the position and orientation in which a workpiece must be placed on at least one overpallet.

11. The cell of claim 1, where a claw of said robot comprises a lower clamp, an upper clamp, and at least one pusher.

12. The cell of claim 11, where the lower clamp of said claw may comprise two symmetrical arms, inside which there is a number of guides arranged that are configured to hold an overpallet.

13. A cell for mounting components on a workpiece, the cell comprises:
   a workpiece comprising a plurality of holes,
   a pressing device to insert, using pressure, at least two components in a corresponding number of holes of the workpiece, wherein the pressing device in turn comprises: a press having an actuation shaft; a plurality of pushers arranged to individually receive a component of said at least two components to be inserted, wherein the shaft of each of the pushers is parallel to said actuation shaft of the press, the pushers being configured to move and be alternatively situated coaxially to the press in order to receive the force exerted by said press and transmit it to the component to be inserted into the hole of the workpiece; a striking plate that is configured to bear the insertion stresses exerted by said press, where the striking plate is configured to turn around a shaft parallel to said actuation shaft and comprises a plurality of support points that may be moved in order to be alternatively positioned in an aligned way with a pusher of said plurality of pushers that is arranged coaxially to the press; and a linear manipulator configured to move the pushers until one of them is aligned with the press, the linear manipulator enabling the pushers to be moved up to loading positions of the at least two components to be inserted, coming from a storage or feeder system, and wherein said at least two components are provided simultaneously to respective pushers; and
   a robot configured to position the workpiece in the pressing device such that one of the holes of the workpiece is between the pusher and the support of the striking plate and aligned with the shaft of the press, the robot being foreseen to locate the workpiece on the striking device without releasing the workpiece and hold the workpiece during the insertion operation but without force being carried out.

14. The cell of claim 13, where said plurality of pushers are configured to receive a respective plurality of components, where said components are of at least a first type and at least a second type that is different to the first one.

15. The cell of claim 13, where the pushers comprise a portion that is common or identical to all of them and a lower portion that is specific for each component that is to be inserted, the said lower portion being configured to receive the push from the common portion when the press is activated, wherein the lower portion is interchangeable to enable the component to be inserted to be changed and use the same pusher to insert several components.

16. The cell of claim 13, where the press is arranged vertically and the robot holds the workpiece below the press such that one of the holes of the workpiece is in a vertical position.

17. The cell of claim 13, where said linear manipulator is configured to provide simultaneously a plurality of components of at least a first type and at least a second type that is different from the first type, to be coupled to a respective plurality of pushers of the pressing device.

18. The cell of claim 13, where the workpieces are arranged on a plurality of overpallets comprising a plurality of reference elements configured to indicate the position and orientation in which a workpiece is placed on at least one overpallet, wherein the robot is configured to pick up the at least one overpallet having the workpiece placed thereon and carry the at least one overpallet having the workpiece placed thereon to the pressing device.

19. The cell of claim 13 further comprising:
   a conveyor belt configured to transport a plurality of transport implements; and
   a plurality of overpallets that are configured to be placed on a respective transport implement, wherein each of the overpallets comprises a plurality of reference elements designed to indicate the position and orientation in which a workpiece must be placed on at least one overpallet.

20. The cell of claim 13, wherein said workpiece is a knuckle.

* * * * *